Jan. 13, 1970     C. D. MORELAND     3,489,345
HEATER CONTROL
Original Filed Feb. 27, 1967     5 Sheets-Sheet 1

INVENTOR
COLBY D. MORELAND
BY Strauch, Nolan, Neale, Nies & Kurz
ATTORNEYS

INVENTOR
COLBY D. MORELAND

Jan. 13, 1970  C. D. MORELAND  3,489,345
HEATER CONTROL

Original Filed Feb. 27, 1967  5 Sheets-Sheet 4

FIG. 5

INVENTOR

COLBY D. MORELAND

BY Strauch, Nolan, Neale, Nies & Kurz
ATTORNEYS

United States Patent Office 3,489,345
Patented Jan. 13, 1970

3,489,345
HEATER CONTROL
Colby D. Moreland, Waynesboro, Ga., assignor to White Consolidated Industries, Inc., a corporation of Delaware
Original application Feb. 27, 1967, Ser. No. 629,346, now Patent No. 3,367,408, dated Feb. 6, 1968. Divided and this application Nov. 13, 1967, Ser. No. 682,082
Int. Cl. F23n 3/00
U.S. Cl. 236—9                                                4 Claims

ABSTRACT OF THE DISCLOSURE

Temperature responsive controls which are particularly useful for controlling the speeds of the blower motors in heating and heating-cooling type air conditioning systems. Current flow to the motor is controlled by a periodically closed switch. A circuit including a thermistor varies the duration for which the switch is closed in each cycle as the resistance of the thermistor changes so that the speed of the motor is varied as the temperature sensed by the thermistor changes.

RELATION TO OTHER APPLICATIONS

This application is a division of application No. 629,346 filed Feb. 27, 1967 and now Patent No. 3,367,408 granted Feb. 6, 1968.

BACKGROUND AND SUMMARY OF THE INVENTION

This invention relates in one aspect to motor speed controls and, more specifically, to controls for regulating the speed of blower motors and the like. In another aspect this invention relates to heating and air conditioning systems having variable speed blowers.

In conventional hot air heating and cooling systems, the system blower operates at a fixed speed; and therefore, there is a constant rate of flow of the air being heated or cooled over the heat exchanger by which heat is added to or removed from the air. Consequently, the temperature of the air delivered to the area to be heated will vary considerably, particularly during transient conditions such as when the system comes on or goes off. This may cause discomfort to the occupants of the area being heated or cooled and, moreover, materially reduces the efficiency of the system.

I have now discovered a novel motor speed control which eliminates these problems by adjusting the speed of the blower as the temperature of the heat exchanger over which it passes varies to maintain the temperature of the delivered air constant. Generally speaking, my novel motor speed control consists of a gate triggered, solid state A.C. switch connected in series with the blower motor and a thermistor or other resistor having a resistance proportional to the temperature of its environment for controlling the application of gate voltage to the electronic switch. As the temperature increases in a heater or decreases in a cooler the resistance of the thermistor will decrease, resulting in the switch being fired earlier in its operating cycle. This increases the blower speed and, consequently, the flow of air across the heat exchanger to maintain the temperature of the delivered air constant. Conversely, as the temperature of the heat exchanger moves in the opposite direction, the resistance of the thermistor increases, decreasing the motor speed and air flow rate to compensate for the temperature change. If both a heater and a cooler are being controlled, a negative thermistor is employed to control the heater, and a positive thermistor may also be employed to control the cooler.

My speed control is also preferably provided with one or more adjustable potentiometers for setting the heat exchanger temperatures at which the blower will be turned off and on. There may also be included in my novel speed control a circuit for absorbing part of the current surge which occurs when the electronic switch is turned on to prevent overloading of the switch. Other circuits may be incorporated in my control to eliminate motor hum and radio frequency static.

In accord with the present invention the novel motor speed control just described may be incorporated into an air conditioning control system (by air conditioning system is meant a system for heating or cooling or both) provided with a thermostat for controlling the operation of the blower and other system components such as burners and refrigeration units, for example, in accord with changes in temperature in the area in which the thermostat is located. A novel changeover arrangement preferably included in the control switches the system between its heating and cooling cycles as the temperature in the conditioned space changes. This may be incorporated in a separate plug-in unit. For heating only the plug-in unit is not employed, thus significantly reducing the cost of the unit. For units where both heating and cooling is involved, the plug-in unit can be easily and quickly added.

Also, my speed control is preferably provided with a novel adjustment feature which permits its use with systems of different capacities. This is an important practical feature of my invention for obvious reasons.

Other blower motor speed controls have heretofore been proposed. Generally, these have been electromechanical in nature or have employed transistors or tube type devices such as thyratrons to control the application of operating voltage across the blower. Exemplary of these previously proposed control systems are those disclosed in United States Patents Nos. 3,196,692, issued Sept. 27, 1965 to R. E. Wood for Refrigeration Head Pressure Control Systems and 3,171,595, issued Mar. 2, 1965, to V. G. Krenko for Controls for Air Heating Systems.

In comparison to these previously known control systems those which I have invented have a number of important advantages. They are simpler and less susceptible to failure, making them less expensive to manufacture and maintain and increasing their service life. They are much more versatile in that the same simple control can be employed to control blower operation for both heating and cooling; and operating parameters such as blower cut-on and cut-off temperatures can be readily adjusted. Further, they can be quickly modified to control two or more blowers and/or to control blower motors requiring more current than one electronic switch is capable of carrying. Another advantage is that my novel blower speed controls can be readily incorporated into existing air conditioning installations to provide the advantages discussed above.

Yet another advantage of my novel motor speed controls is that a single standardized control can be employed for units of different capacities since my controls can be readily adjusted for operation of such different units.

From the foregoing discussion of the present invention, its advantages, and the problems it was developed to overcome, it will be apparent that one important and primary object of the present invention is the provision of novel, improved, temperature responsive blower motor speed controls.

A related important and primary object of this invention resides in the provision of novel, improved air conditioning control systems which have temperature responsive blower motor speed controls.

Other related and important but more specific objects of the present invention are the provisions of temperature responsive blower speed motor controls, which:

(1) are simpler and less expensive to manufacture and maintain than those heretofore known;

(2) are less susceptible to failure than those heretofore known and have a longer service life;

(3) are more versatile than those heretofore known;

(4) in conjunction with the preceding object, can be set to control blower operation during heating or cooling or both;

(5) in conjunction with object No. (3), can be easily adjusted to cut the blower on and off at the desired temperatures and/or to set the blower output for a given temperature;

(6) can be easily modified to control plural blower motors and/or blower motors requiring more current than a single electronic switch is capable of carrying;

(7) can be readily added to existing installations;

(8) includes a gate triggered solid state switch for controlling the application of operating voltage to the blower motor and a gate circuit including a thermistor or similar circuit component located in heat transfer relationship to the heat exchanger over which the air is directed to regulate the triggering of the switch and the speed of the blower motor in accord with the temperature of the heat exchanger;

(9) can be readily incorporated into controls for regulating the operation of a complete air conditioning system;

(10) can be readily adjusted to control the operation of units of different capacities;

(11) include a novel changeover arrangement for automatically switching the unit controlled thereby between heating and cooling as the temperature in the conditioned space changes;

(12) in conjunction with the preceding object, have a changeover arrangement which is a separate unit.

Other objects, additional advantages, and further important features of the present invention will become apparent from the appended claims and as the ensuing detailed description and discussion of exemplary embodiments of the present invention proceeds in conjunction with the accompanying drawing.

Detailed description of preferred embodiments

Figure 1:
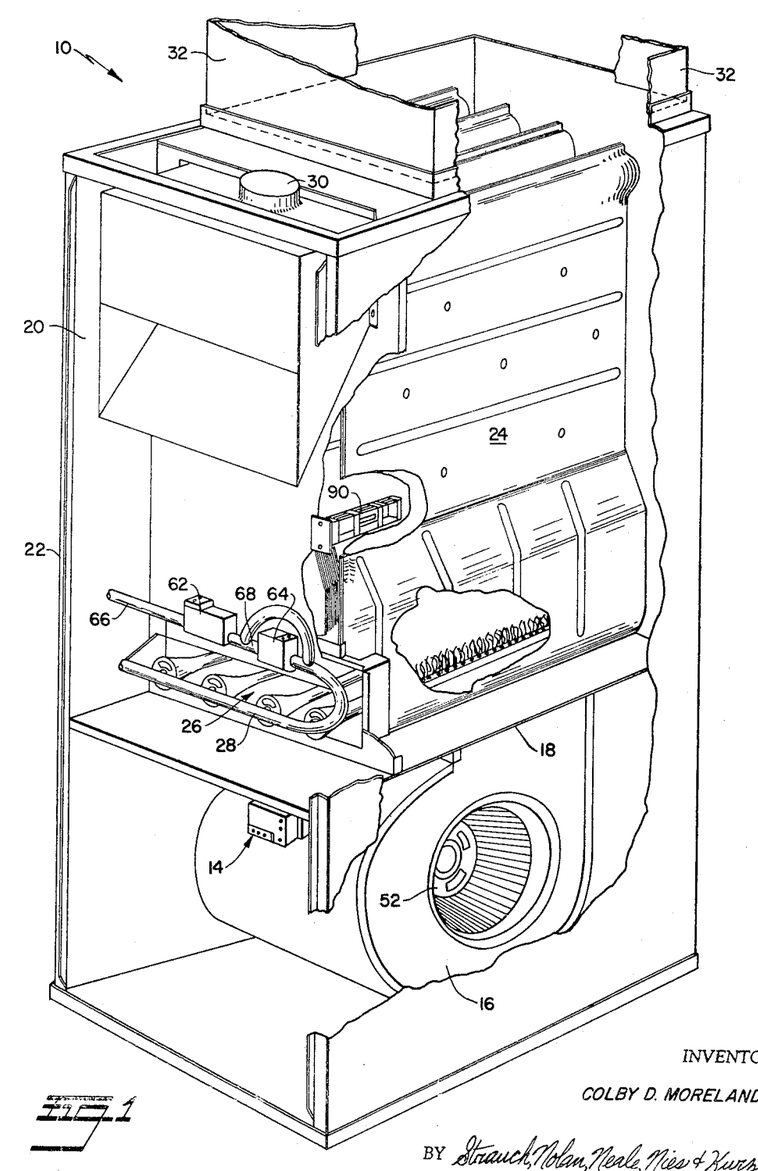
FIGURE 1 is a generally diagrammatic view of an air conditioning unit equipped with a control system constructed in accord with the principles of the present invention and including a temperature responsive blower motor speed control as disclosed and claimed herein.

Referring now to the drawing, FIGURE 1 illustrates the air conditioning unit 10 of an air conditioning system[1] having a control system 12 constructed in accord with the principles of the present invention and equipped with a temperature responsive speed control 14 for blower 16 of the air conditioning unit.

Unit 10 is of conventional construction, and its details are not part of the present invention. Accordingly, this unit will not be described in detail herein.

Briefly speaking, however, the blower 16 mentioned previously effects a flow of air from a return air duct (not shown), for example, through a duct 18 and upwardly through a chamber 20 defined by the casing 22 of the unit.

Assuming that the air is to be heated, as it moves upwardly through chamber 20, it flows over the surfaces of and is heated by the transfer of heat from a heat exchanger 24. Heat exchanger 24, in turn, is heated by combustion products from a burner unit 26 provided with a liquid or gaseous fuel through a fuel conduit 28. After passing through heat exchanger 24, the combustion products are vented through an exhaust duct 30. From chamber 20, the air heated by the combustion products flows into a duct 32 from which it is distributed to the area or areas to be heated.

If the air is to be cooled rather than heated, the burner unit remains inoperative; and the air flows upwardly through the chamber and across the cooling coils 34 (see FIGURE 3) of a refrigerating (or other air cooling) unit (not shown) which may be an original part of the air conditioning unit or of the add-on type.

Figure 2:
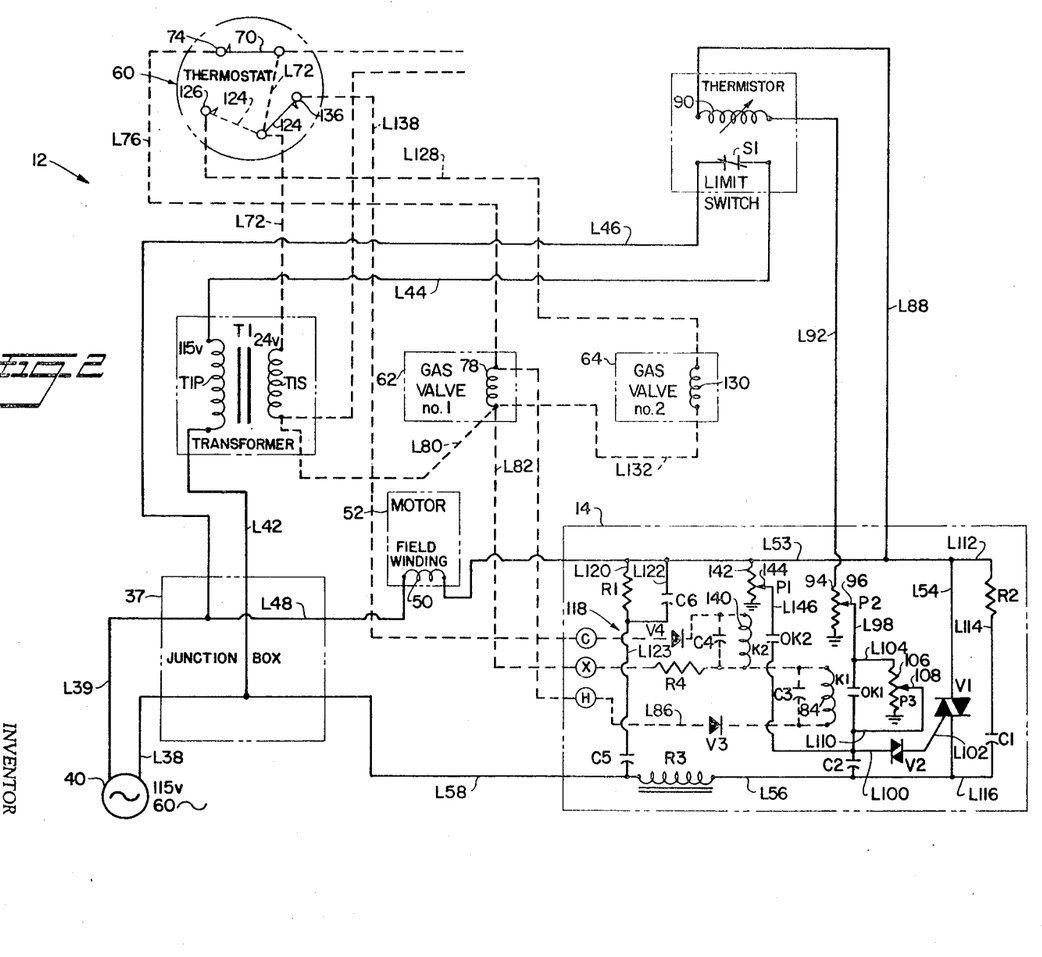
FIGURE 2 is a schematic illustration of the control system.

Referring next to FIGURE 2, the control system 12 for the air conditioning unit just described includes a junction box 37 connected by leads L38 and L39 to a suitable source of 115 volt alternating current 40. A lead L42 is connected from lead L38 in junction box 37 to one end of the primary winding T1P of a control system transformer T1. The opposite end of winding T1P is connected by lead L44 to one side of a conventional temperature responsive limit switch S1 responsive to the temperature of heat exchanger 24. The opposite side of limit switch S1 is connected by lead L46 to main lead L39 in junction box 37.

Limit switch S1 is a safety feature. If heat exchanger 24 is overheated during operation of burner unit 26, limit switch S1 opens, interrupting the circuit between transformer primary winding T1P and power source 40. This interrupts the flow of fuel to and cuts off burner unit 26.

Main lead L39 is also connected by a lead L48 to the field winding 50 of the motor 52 of blower 16. The opposite end of field winding 50 is connected by leads L53 and L54 to one terminal of a gate-controlled, solid state electronic switch V1, which is preferably, although not necessarily, a Triac.

A Triac is a bidirectional thyristor, which may be gate triggered from a blocking to conducting state for either polarity of applied voltage. Triacs are described in detail in General Electric Advance Specification 175.10/264 and General Electric Publication Number 175.10 2/65, to which reference may be had if deemed necessary for a complete understanding of the present invention.

The other terminal of Triac V1 is connected through lead L56, choke coil R3, and lead L58 to main lead L38 in junction box 37. Therefore, when Triac V1 is triggered, blower motor 52 is connected across the source of operating voltage 40 by the Triac to energize the motor.

Triac V1 is incorporated in motor speed control 14; and this control and a thermostat 60 control the operation of blower motor 52. Thermostat 60 also controls the opening and closing of two electrically operated valves 62 and 64 in a pair of fuel conduits 66 and 68 which supply fuel to the conduit 28 connected to burner unit 26 (see FIGURE 1).

Referring again to FIGURE 2, thermostat 60 is of conventional construction, including a bimetallic actuator 70 connected by lead L72 to the secondary winding T1S of transformer T1. Actuator 70 is adapted to engage a contact 74 when the temperature in the area in which

---

[1] As mentioned previously, the terms "air conditioning system" and "air conditioning unit" are used herein to identify units and systems for heating or cooling or both. The term "air conditioning" is likewise not intended to be indicative of apparatus designed to heat and/or cool air for a specific intended use.

thermostat 60 is located drops below a predetermined temperature to complete a circuit from the contact through lead L76, the solenoid 78 of gas valve 62, and lead L80 to the opposite side of transformer secondary T1S. This energizes the solenoid, opening valve 62. Fuel then flows through conduits 66 and 28 to burner unit 26, where it is ignited by any desired conventional type of igniter.

The engagement of thermostat actuator 70 with contact 74 also completes a circuit from gas valve solenoid 78 through lead L82 to the solenoid 84 of a relay K1 incorporated in motor speed control 14. Solenoid 84 is also connected by leads L86 and L76, contact 74, actuator 70, and lead L72 to the opposite side of transformer secondary T1S so that completion of the foregoing circuit energizes relay K1. Relay K1 will typically be a 24 volt D.C. relay. Diode V3 inserted in lead L86 provides D.C. power for the operation of the relay and, together with resistance R4, prevents objectionable feedback in the speed control circuitry.

Upon energization of solenoid 84, the normally open contact OK1 of relay K1 closes. A capacitor C3 connected in parallel with solenoid 84 between leads L82 and L86 prevents arcing across contact OK1 as it closes and subsequently opens.

Closing of contact OK1 completes a charging circuit from lead L53 through: (1) lead L88; (2) a thermistor 90 responsive to the temperature of heat exchanger 24; (3) lead L92, which is connected to the resistance 94 of a potentiometer P2 incorporated in motor speed control 14; (4) the slider 96 of potentiometer P2; and (5) the lead L98 in which contact OK1 is located to charging capacitor C2. The charging capacitor is also connected to energized lead L56 and to the gate of Triac V1 by a discharge circuit including: (1) lead L98; (2) a branch lead L100; (3) a trigger diode such as a Diac [2]; and (4) lead L102.

The capacitor charging and discharge circuits just described control the triggering of Triac V1. Specifically, capacitor C2 is charged during the positive half-cycle of the voltage supply from A.C. source 40. When the polarity of the supply voltage reverses, capacitor C2 discharges through lead L100, Diac V2, and lead L102, triggering the Triac. This makes the Triac conductive; and operating voltage is therefore applied across blower motor 52. When the polarity of the supply voltage again reverses, the Triac is extinguished; and the process repeats.

The function of thermistor 90 is to regulate the speed of blower motor 52 so that the delivered air will be at the same temperature regardless of the temperature of heat exchanger 24. In other words, thermistor 90 so controls the operation of Triac V1 that, as the temperature of heat exchanger 24 increases, for example, the speed of motor 52 will be increased to increase the volume of air supplied by blower 16. Consequently, although more heat is given off by heat exchanger 24 as its temperature increases, this heat is distributed to a greater volume of air, maintaining the air at the same temperature.

This control function results from the fact that, as the temperature of heat exchanger 24 increases, the resistance of thermistor 90 decreases. Consequently, charging capacitor C2 is charged for a greater portion of the charging half-cycle; and, as a result, a greater charge is stored in capacitor C2. Triac V1 is therefore triggered earlier in the succeeding discharge half-cycle; and motor 52 is energized for a greater portion of the half-cycle, increasing its speed. In one exemplary embodiment of this invention, thermistor 90 is capable of compensating for an 85° F. temperature change.

Potentiometer P2 is provided so that the blower motor speed and therefore the volume of delivered air for a given thermistor temperature can be varied. Specifically, by moving potentiometer slider 96 relative to potentiometer resistance 94, resistance can be added to and subtracted from the capacitor charging circuit described previously to shift the temperature-resistance curve of the thermistor. This varies the resistance in the circuit for any given temperature sensed by the thermistor; and, as discussed above, the circuit resistance dictates the firing of Triac V1 and, therefore, the speed of blower motor 52.

The provision of potentiometer P2 is a salient feature of the present invention since it permits a single standard control to be adjusted for use with air conditioning units of different capacities. The importance of this universal adaptability of the control is self-evident.

When the temperature in the area being heated reaches the desired temperature (or a slightly lower temperature), bimetallic actuator 70 warps away from contact 74, interrupting the circuit through fuel valve solenoid 78. This closes the valve, extinguishing the fire in burner unit 26.

Movement of actuator 70 out of engagement with contact 74 also interrupts the circuit through the solenoid 84 of relay K1, restoring contact OK1 to its normally open position.

As shown in FIGURE 2, opening of contact OK1 completes an alternate circuit from thermistor 90 to charging capacitor C2 through lead L104, the resistance 106 of potentiometer P3, the potentiometer slider 108, lead L110, and lead L98. This places an additional resistance, that of potentiometer P3, in the capacitor charging circuit. The capacitor therefore charges more slowly; and Triac V1 is triggered later in the discharge half-cycle, reducing the portion of the cycle for which motor 52 is energized and, therefore, the speed of the motor and blower 16.

The addition of the resistance of potentiometer P3 to the charging circuit in the manner just described markedly decreases the speed of blower 16 practically simultaneously with the termination of the supply of heat to heat exchanger 24, which is cooled rapidly by the air flowing over it as soon as the burner unit is shut off. Thus, there is a sharp reduction in the volume of air moved over the heat exchanger at the same time that the burner unit is shut off so that the air delivered subsequent to burner cut-off will be at the desired delivery temperature.

Thereafter, as heat exchanger 24 continues to cool, the resistance of thermistor 90 increases, continuously effecting a reduction in the speed of motor 52. The speed reduction continues until the resistance in the charging circuit becomes sufficiently high to prevent capacitor C2 from being charged to the trigger voltage, cutting off blower 16. The point of cut-off, which will typically be in the range of 85–105° F., can be adjusted by moving potentiometer slider 108 to vary the resistance provided by potentiometer P3.

It will be apparent to those skilled in the art to which the present invention pertains that I have described above a complete and operable embodiment of the present invention. However, there are additional features which I preferably incorporate in this invention to increase versatility, improve performance, etc.

One of these features is a delay circuit including a series-wired resistance R2 and capacitor C1 connected in parallel with Triac V1 by leads L112, L114, and L116. When Triac V1 is triggered, there is an immediate surge of current through it. The delay circuit just described absorbs part of this surge, stabilizing the Triac and preventing it from being overloaded. The circuit consisting of capacitor C1, resistor R2, and leads L112 and L116 also eliminates D.C. power from the circuit, thereby eliminating motor hum.

Another feature which I preferably incorporate in the control system described above is a filter circuit 118. In addition to the choke coil R3 mentioned previously, this circuit includes a resistance R1 and capacitor C6 wired

---

[2] A Diac is a diffused silicon bidirectional trigger diode having a three-layer structure with negative resistance switching characteristics for both directions of applied voltage. Diacs are described in more detail in General Electric Advance Specification No. 175.30 2/64, to which reference may be made if deemed necessary for a more complete understanding of the present invention.

in parallel and connected at one end to lead L53 by leads L120 and L122. The other end of the R-C circuit is connected by lead L123 through capacitor C5 to lead L58. The filter circuit just described eliminates radio frequency static.

As shown in FIGURE 2, I also preferably employ in my invention a thermostat 60 having a second bimetallic actuator 124 connected in parallel with actuator 70. Actuator 124 engages a heating contact 126 when the temperature to which it responds decreases below a second predetermined temperature. Contact 126 is connected through lead L128 to the solenoid 130 of the second gas valve 64. The opposite end of the solenoid is connected by leads L132 and L80 to transformer secondary T1S.

Contact of actuator 124 with contact 126 completes a circuit through solenoid 130 which energizes the solenoid and opens gas valve 64 to supply additional fuel to burner unit 26. Actuator 124 is set so that the foregoing circuit will not be completed unless the temperature in the area being heated falls to a temperature typically on the order of 1.5 degrees below that at which actuator 70 engages contact 74 to open gas valve 62. Thus, actuators 70 and 124 provide a low fire-high fire mode of operation. Burner unit 26 is operated at low fire when the difference between the actual and desired temperature in the area being heated is small and at high fire when this differential is larger.

I also preferably provide in control system 12 for the operation of blower 16 in such a manner as to effect a flow of air across the cooling unit coil 34 in applications where both area heating and cooling is desired. Specifically, bimetallic actuator 124, which is connected to transformer secondary T1S through lead L72, is adapted to engage a third contact 136 when the temperature in the area in which thermostat 60 is located exceeds a predetermined temperature. As shown in FIGURE 2, engagement of actuator 124 with contact 136 completes a circuit from energized lead L72 through lead L138 to the solenoid 140 of a relay K2 incorporated in blower speed control 14 (relay K2 may be of the same type as relay K1). The other end of relay K2 is connected through leads L82 and L80 to the opposite side of transformer secondary T1S with a diode V4 in lead L138 performing the same functions as diode V3 does in the operation of relay K1. Thus, engagement of actuator 124 with contact 136 energizes relay K2, closing its normally open contact OK2 (a capacitor C4 connected across leads L138 and L82 in parallel with solenoid 140 prevents arcing as contact OK2 closes and opens).

When actuator 124 is engaged with contact 136, actuator 70 is out of engagement with contact 74, and the resistance of potentiometer P3 and thermistor 90 is sufficiently high that Triac V1 will not be triggered and motor 52 energized through the circuit described above. However, as shown in FIGURE 2, energization of relay K2 completes an alternate charging circuit from energized lead L53 through the resistance 142 of a potentiometer P1, the potentiometer slider 144, lead L146, and the closed contacts OK2 of relay K2, to lead L98. Therefore, when actuator 124 engages cooling contact 136, capacitor C2 is charged through this alternate circuit and controls the operation of Triac V1 in the manner described previously in conjunction with the heating cycle.

By moving potentiometer slider 144 relative to potentiometer resistance 142, the amount of resistance in this alternate circuit can be varied. By changing this resistance in this alternate circuit can be varied. By changing this resistance, the amount of air delivered by blower 16 in the cooling part of the cycle can be varied. This is because the resistance in the alternate cycle determines the time require to charge capacitor C2 and, therefore, the time of triggering of Triac V1 and the speed of blower motor 52.

The changeover arrangement just described is also considered an important feature of the present invention. Specifically, it provides a simple, practical method of automatically switching the operation of the unit in which it is incorporated between heating and cooling cycles and simultaneously making the changes in the control system needed to insure proper operation of the unit on each of these cycles.

Typical values for the components in the control system 10 described above are as follows:

R1—82 ohm A.C., 0.5 w.±10%
R2—270 ohm A.C., 0.5 w.±10%
R3 [3]—RH choke, 100 mmh.
R4—100 ohm A.C., 0.5 w.±10%
C1—.01 mfd., 200 w.v. DC
C2—.01 mfd., 200 w.v. DC
C3—35 mfd., 50 w.v. DC
C4—35 mfd., 50 w.v. DC
C5—.22 mfd., 200 w.v. DC
C6—.05 mfd., 200 w.v. DC
P1—50K ohm potentiometer
P2—50K ohm potentiometer
P3—50K ohm potentiometer It is to be understood, however, that these values will vary depending upon the particular application of the principles of the present invention.

In the control system 10 described above, there is constant speed operation of blower motor 52 in the cooling cycle. This is satisfactory for many applications of the present invention. However, in other applications, variable speed operation of blower motor 52 may be desired so that the delivered cool air will be at the same temperature regardless of the temperature of cooling unit coil 34. A modification of control system 10 providing this mode of operation is illustrated in FIGURE 3 in which like components have been identified by like reference characters.

Figure 3:
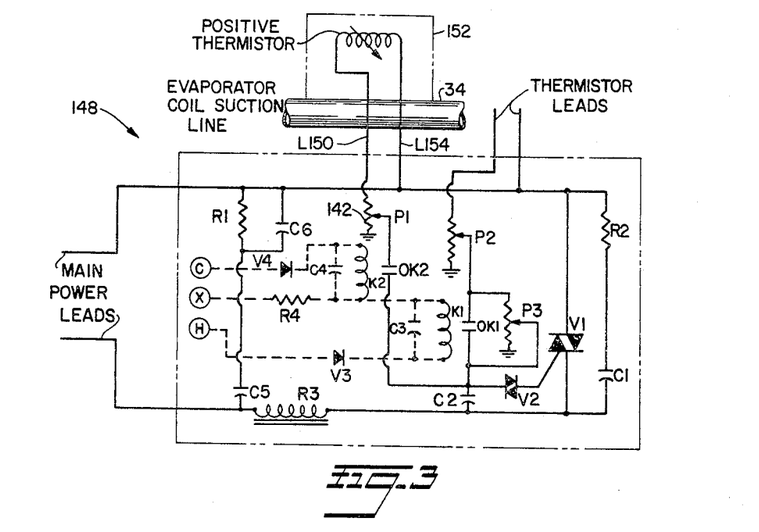
FIGURE 3 is a schematic illustration of a second form of speed control.

The control system 148 of FIGURE 3 is identical to that of FIGURE 2 except that the resistance 142 of potentiometer P1 is connected by lead L150 to a positive thermistor 152 responsive to the temperature of cooling unit coil 34. Thermistor 152 is connected by lead L154 to the energized lead L53 to which potentiometer slider 144 is connected in the embodiment of FIGURE 2. In sum, the circuit of FIGURE 3 is identical to that of FIGURE 2 except that a positive thermistor responsive to the temperature of the cooling unit coil is connected in series with potentiometer P1.

This system operates in the same manner as that of FIGURE 2 except that, as the temperature of coil 34 varies, there is a proportional change in the resistance of the cooling cycle charging circuit for capacitor C2. Thus, as the temperature of the coil decreases, for example, capacitor C2 is charged earlier in the charging half-cycle, Triac V1 is triggered earlier in the triggering half-cycle, and the speed of blower motor 52 is increased. Consequently, as the coil temperature decreases, there is an increased flow of air over it. The heat extracted from the air per unit volume therefore remains the same, ensuring that uniformly temperatured air is delivered to the area to be cooled.

If desired, an additional resistance controlled by a relay (not shown) such as that provided by potentiometer P3 in the embodiment of FIGURE 2 may be wired in parallel with potentiometer P1 in control system 148. The added resistance will control the cut-off point for blower motor 52 in the cooling cycle and provide an immediate reduction in the blower motor speed when the flow of cooling fluid through the evaporator coil is terminated.

Figure 4:
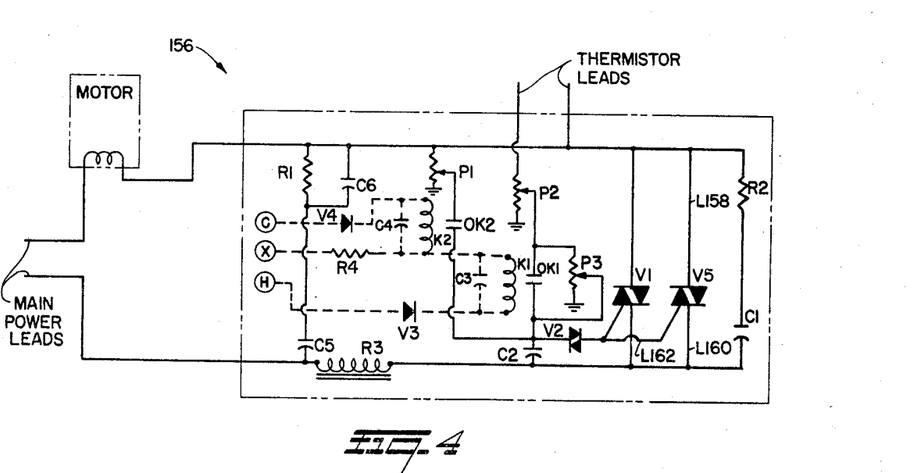
FIGURE 4 is a view similar to FIGURE 3 of a third form of speed control.

In the two control system embodiments described previously, the current load for blower motor 52 is carried by a single Triac V1. For motors having rated loads in excess of a single Triac, the modified control system 156 illustrated in FIGURE 4 is preferably employed. This sys-

---

[3] Constructed by wrapping an 0.25 inch diameter Farite rod with 50 turns of #12 Formex transformer wire.

tem, for the most part, is identical to those described earlier; and, therefore, like reference characters have been employed to identify like components.

Referring now to FIGURE 4, for motors of higher capacity, a second Triac V5 is connected in parallel with Triac V1 and the delay circuit by leads L158 and L160. The gate of Triac V5 is connected in parallel with the gate of Triac V1 by a third lead L162.

The operation of this embodiment is the same as those described previously except that both Triacs are triggered simultaneously by the discharge of capacitor C2 and cut off simultaneously by the reversal of the polarity of the voltage of power source 40. The current flowing through the motor is therefore shared between the Triacs, substantially increasing the capacity of the motor which the control system is capable of handling.

It will be obvious to those skilled in the art to which this invention pertains that modifications such as those discussed above in conjunction with the embodiment of FIGURE 3 can be made in the control system of FIGURE 4, if desired.

The two Triacs V1 and V5 illustrated in the embodiment of FIGURE 4 may also be employed to control two blower motors rather than one. The modifications necessary to provide this mode of operation are shown in FIGURE 5 in which, again, like reference characters have been employed to designate like components.

Figure 5:
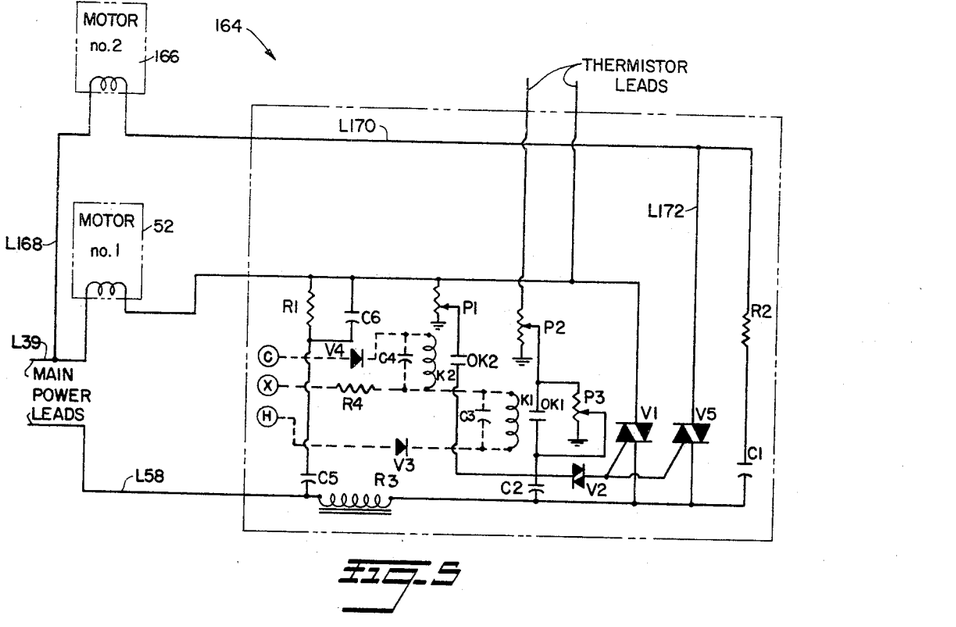
FIGURE 5 is a schematic illustration of a fourth form of speed control.

The control system 164 illustrated in FIGURE 5 is identical to that of FIGURE 4 except that a second blower motor 166 is connected to main power lead L39 by a lead L168 and to Triac V5 by leads L170 and L172. The operation of motor 166 is controlled by Triac V5 inasmuch as the Triac is wired in series with motor 166 between main power leads L39 and L58.

As the series circuit R2–C1 is still connected in parallel with lead L172 and Triac V1 in this embodiment, it absorbs the surge which would otherwise go through the Triacs. The operation of this embodiment is otherwise the same as that of the embodiments decribed previously; and this embodiment of the present invention may be provided with any of the modifications described above in conjunction with other embodiments.

Figures 6, 7:
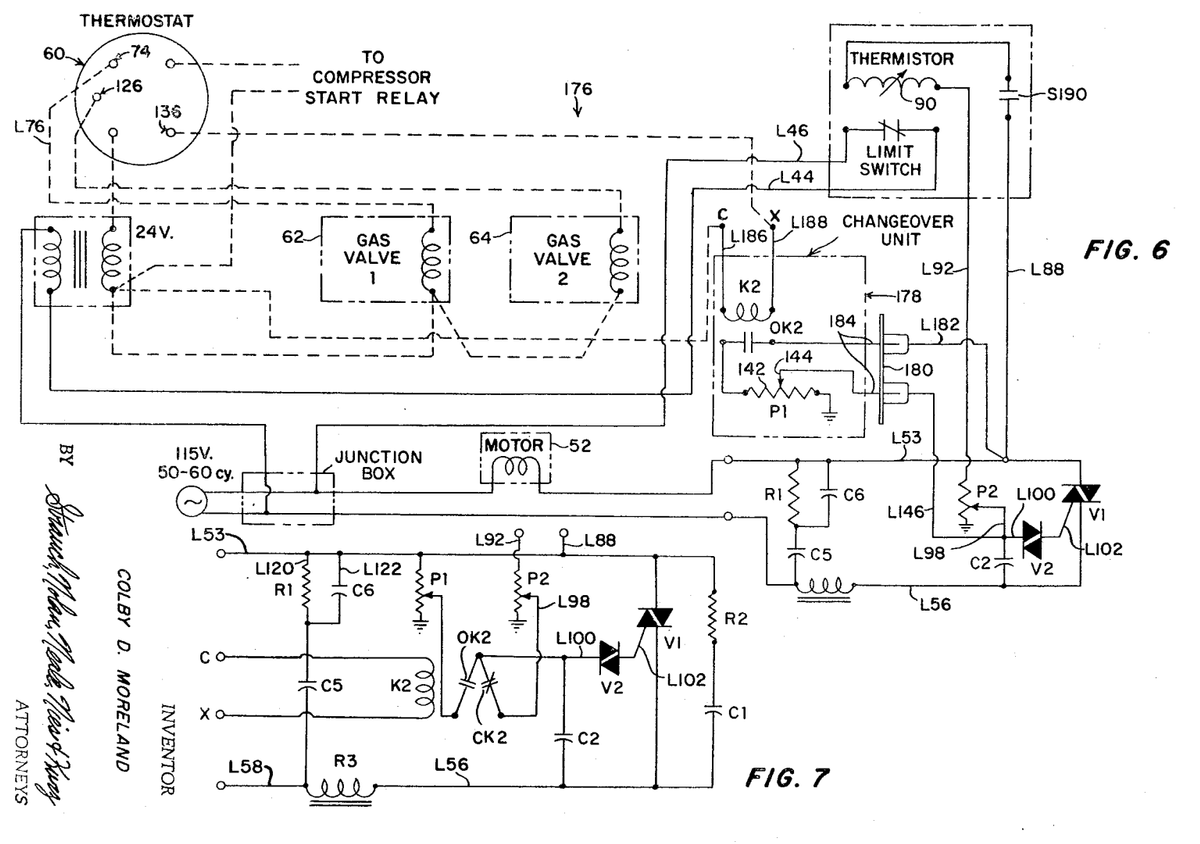
FIGURE 6 is a schematic illustration of a fifth form of control.
FIGURE 7 is a schematic illustration of a sixth form of control.

The speed control circuit 176 illustrated in FIGURE 6 is similar to those described previously except that the changeover relay K2 and the potentiometer P1 provided for adjusting the blower speed are incorporated in a separate, plug-in type changeover unit identified generally by reference characters 178. As mentioned briefly above, this is an important practical feature of the present invention. Specifically, it permits simplification of the basic control, which is all that is required when heating only is involved, thereby significantly reducing its price. Furthermore, in applications where both heating and cooling are present, the changeover unit can be easily and simply added, either at the factory or in the field. Similarly, where a cooling unit is added to an existing heating unit, addition of the changeover unit can be readily accomplished.

In this embodiment of the present invention, the basic control is provided with a female plug 180. Lead L146 is is connected to one terminal of this plug, and the second terminal is connected through a lead L182 to the junction of leads L53 and L88. Changeover unit 178 is provided with a cooperating male plug 184. One terminal of the male plug is connected to normally open contacts OK2 of relay K2, and the other is connected to the slider 144 of potentiometer P1. When changeover unit 178 is plugged into the basic control, slider 144 is connected through plugs 184 and 180 to lead L146 as in the embodiment of the invention shown in FIGURE 2. Similarly, this connects relay contacts OK2 and the resistance 142 of potentiometer P1 in series between main lead L53 and ground as in the embodiment of FIGURE 2.

The connection of unit 178 to the basic control is then completed by connecting leads L186 and L188 to terminals C and X as in the embodiment of FIGURE 2. Accordingly, with changeover unit 178 connected, control 176 will function in the same manner as control unit 12 at least as far as the operation of the changeover relay and potentiometer P1 are concerned.

FIGURE 6 illustrates yet another variation which may be made in the control of FIGURE 1 within the scope of the present invention; viz., the elimination of the cut-off circuitry including relay K1 and potentiometer P3. As discussed above in conjunction with the embodiment of FIGURE 1, the foregoing circuitry is employed to so modify the operation of the control after the burners in burner unit 26 are turned off as to maintain the flow of heated air to the space being conditioned at a generally uniform temperature. Since this flow continues for a relatively short period of time, it may, in some applications, be acceptable to continue to control the blower speed solely by thermistor 90. As the heat exchanger cools, the resistance of the latter will increase to the point where capacitor C2 will not change to a voltage sufficiently high to fire Triac V1. At this point motor 52 will be completely shut off. Again, the elimination of the circuitry just described is an important practical feature of the invention since it provides a further significant reduction in the cost of the control.

As a further example of simplifications which may be made in control 12 in the interest of economy where optimum performance is not required, resistor R2 and capacitor C1 may be deleted as shown in FIGURE 6. This modification may be made in circumstances where current surges through the Triac and the presence of D.C. power in the circuit are not problems.

Another modification shown in FIGURE 6 is the incorporation of an on-off switch S190 in series with thermistor 90. The opening and closing of switch S190 is controlled by a temperature responsive actuator (not shown) located in heat exchange relationship to heat exchanger 24. When the temperature of the latter is below a specified point, switch S190 will be open. Consequently, the blower will not be energized when the temperature of the heat exchanger is below the specified level. This will prevent blower 16 from delivering air to the space being heated when it is below this specified temperature both on start-up of unit 10 and after the burners in burner unit 26 are shut off. This arrangement is particularly useful with simpler versions of the present invention in which the cut-off circuitry incorporated in the embodiment of FIGURE 2 is not employed.

Yet another modification shown in FIGURE 6 is a substitution of an A.C. relay in changeover unit 178 for the D.C. relay employed in control system 12. Use of an A.C. relay permits the elimination of the capactior C4 and diode V4 needed to operate relay K2 in system 12, thereby further simplifying and reducing the cost of the control.

FIGURE 7 shows yet another modification which may be made in the controls described above. In the embodiments of the invention described previously, the circuitry which controls the operation of blower motor 52 on the heating cycle remains energized during the cooling cycle. This may be undesirable in some applications such as those where the unit remains on the cooling cycle for long periods of time. In the control 192 shown in FIGURE 7, this problem is eliminated by interrupting the flow of current to the heating cycle part of the circuitry while unit 10 is operating on the cooling cycle. To accomplish this, changeover relay K2 is provided with a second, normally closed contact CK2, which is wired in parallel with normally open contact OK1 between the slider 144 of potentiometer P1 and lead L98. When thermostat actuator 124 engages contact 136 to energize changeover relay K2, contact CK2 opens, interrupting the circuit through potentiometer P2 and thermistor 90, preventing the flow of current through these components. Control 192 otherwise operates in the same manner as the control 176 illustrated in FIGURE 6.

This modification of the present invention can also be employed in its more sophisticated versions such as that illustrated in FIGURE 2 for example. In the latter, the opening of the additional contact upon energization of the changeover relay will interrupt the flow of current through the other components controlling the blower operation during the heating cycle as well as potentiometer P2 and thermistor 90.

Several exemplary modifications of the present invention have been discussed above. Other modifications will be readily apparent to those skilled in the arts to which this invention relates. For example, components of the illustrated control systems operable only in a heating cycle can be eliminated if the control system is to be used with a unit or system which has only a cooling function. It will also be apparent that the principles of the present invention are adaptable to applications involving the conditioning of air for industrial and other processes as well as for area heating and cooling. To the extent that such modifications and applications of the present invention are not expressly excluded from the appended claims, they are fully intended to be encompassed therein.

Also, it will be apparent to those of ordinary skill in the relevant arts that the invention described above can be used to control the operation of oil-fired, electric, and other units as well as the gas-fired units specifically referred to above, and that it may be employed to control the speed of motors other than blower motors, if desired. Accordingly, these and other similar applications of my invention are intended to be covered by the ensuing claims except as they are expressly excluded therefrom.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In an air conditioning apparatus or the like: heat exchanger means; at least two blowers for effecting a flow of air in heat transfer relationship to said heat exchanger means to thereby modify the temperature of said air; electric motors for driving said blowers; a switch means for controlling the operation of each of said motors, each said switch means having terminals thereof connected in series with the blower motor controlled thereby and a source of operating voltage, whereby said motors are connected across said source of voltage and energized when the switch means are on; cyclically operating switch controlling means for turning said switch means on and off at a predetermined frequency to regulate the speed of said motors; and temperature sensing means operatively connected to said switch controlling means and responsive to a temperature which is proportional to the temperature of the air passed in heat transfer relationship to said heat exchanger means for so varying the duration of the period for which said switch controlling means maintains said switch means on in each operating cycle as to vary the speed of said motors as the temperature sensed by said temperature responsive means changes.

2. In an air conditioning apparatus or the like; a heat exchanger; heating means actuatable to supply heat to said heat exchanger; a blower for effecting a flow of air in heat transfer relationship to the heat exchanger to heat said air; an electric motor for driving said blower; an electronic switch connected in series with the blower motor and a source of operating voltage, whereby said motor is connected across said source of voltage and energized when said switch is on, said electronic switch having a control terminal, the application of a control voltage of predetermined magnitude to which will turn said switch on; cyclically operating switch controlling circuit means for turning said switch on and off at a predetermined frequency to regulate the speed of said motor; said switch controlling circuit means including a capacitor adapted to be alternately charged to a voltage at least equal to said control voltage and discharged through said control terminal to thereby turn said switch means on and off at said predetermined frequency; means for varying the duration of the period for which said circuit means maintains said switch means on in each operating cycle thereof to thereby vary the speed of said motor including a transducer having a resistance which is inversely proportional to the temperature sensed thereby whereby, as the sensed temperature decreases, the transducer resistance increases and said switch is turned on for a period of shorter duration in each cycle, thereby decreasing the motor speed; a charging circuit connecting said capacitor to a source of charging voltage therefor through said transducer; and means operable concomitantly with the deactuation of said heating means to connect a resistance element in series with said transducer and thereby effect a reduction in the speed of the blower motor concurrently with the deactuation of the heat exchanger.

3. In an air conditioning apparatus or the like: air heating means; blower means for effecting a flow of air in heat transfer relationship to at least one component of said air heating means to thereby heat said air; an electric motor for driving said blower means; an electronic switch means for controlling the operation of said motor, said switch means having terminals thereof connected in series with the blower means motor and a source of operating voltage, whereby said motor is connected across said source of voltage and energized when said switch means is conductive, an a gate, the application of a predetermined minimum voltage to which will make said switch means conductive; cyclically operating switch controlling circuit means for making said switch means alternatively conductive and non-conductive at a predetermined frequency to regulate the speed of said motor; temperature sensing means incorporated in said circuit means, said temperature sensing means being operatively connected to said switch controlling means and being responsive to a temperature which is proportional to the temperature of the heated air such that it will vary the duration of the period for which said switch controlling circuit means maintains said switch means conductive in each operating cycle as to vary the speed of said motor as the temperature sensed by said temperature responsive means changes; and means for preventing said motor from being connected across said power source by said switch means until the temperature of the component over which the air flows in heat transfer relationship reaches a specified minimum level, the means for preventing the motor from being connected across the power source until said minimum temperature level is reached comprising a temperature responsive switch incorporated in said switch controlling circuit means in series with said temperature sensing means.

4. In an air conditioning apparatus or the like: burner means; means for supplying fuel to said burner means, said fuel supply means including first and second valve means each adapted to allow fuel to flow to said burner means when open and to prevent fuel from flowing to said burner means when closed, said valves being open when energized; a heat exchanger adapted to be heated by hot gases formed by the combustion of said fluel; blower means for effecting a flow of air in heat transfer relationship to said heat exchanger to thereby heat said air; an electric motor for driving said blower means; switch means for controlling the operation of said motor, said switch means having terminals thereof connected in series with the blower means motor and a source of operating voltage, whereby said motor is connected across said source of voltage and energized when said switch means is on; cyclically operating switch controlling means for turning said switch means on and off at a predetermined frequency to regulate the speed of said motor; a first temperature sensing means operatively connected to said switch controlling means and responsive to a temperature which is proportional to the temperature of the heated air for so varying the duration of the period for which said switch controlling circuit means maintains said switch means on in each operating cycle as to vary the speed of said motor as the temperature sensed by said temperature responsive means changes; and second temperature sensing means responsive to the temperature of the environment in which it is located having first contacts interposed between said power source and one of said valve means and between said power source and said blower motor and adapted to close when the temperature of said environment falls to said predetermined temperature to energize and open said valve means and to connect said blower to said power source through said circuit means, said second temperature sensing means further including second contacts adapted to close at a predetermined temperature lower than that at which the contacts close interposed between said power source and the other of said valve means whereby, if the temperature in the environment in which said second temperature sensing means is heated falls to said lower temperature, said second contacts will close and connect said other valve means across said power source, thereby energizing and opening said valve means and increasing the rate of fuel supply to and the heat output from said burner means.

References Cited

UNITED STATES PATENTS

| | | | |
|---|---|---|---|
| 2,329,636 | 9/1943 | McGrath | 236—11 X |
| 3,057,557 | 10/1962 | Guyton et al. | 318—334 X |
| 3,171,595 | 3/1965 | Krenke | 236—9 |
| 3,196,629 | 7/1965 | Wood | 62—183 |
| 3,229,225 | 1/1966 | Schimpf | 318—341 X |

FOREIGN PATENTS 1,150,325 6/1963 Germany.

EDWARD J. MICHAEL, Primary Examiner

U.S. Cl. X.R.

236—11, 78

UNITED STATES PATENT OFFICE
CERTIFICATE OF CORRECTION

Patent No. 3,489,345　　　　　Dated January 13, 1970

Inventor(s)  C. D. Moreland

It is certified that error appears in the above-identified patent and that said Letters Patent are hereby corrected as shown below:

Column 7, lines 65 and 66, cancel "By changing this resistance is this alternate circuit can be varied.".

Column 7, line 70 change "require" to --required--.

SIGNED AND
SEALED
JUL 7 1970

(SEAL)
Attest:

Edward M. Fletcher, Jr.
Attesting Officer

WILLIAM E. SCHUYLER, JR.
Commissioner of Patents